UNITED STATES PATENT OFFICE.

GEORGE W. ROBBINS, OF ECONOMY, INDIANA.

MEDICAL COMPOUND.

SPECIFICATION forming part of Letters Patent No. 242,792, dated June 14, 1881.

Application filed December 30, 1880. (Specimens.)

*To all whom it may concern:*

Be it known that I, GEORGE W. ROBBINS, a citizen of the United States, residing at Economy, in the county of Wayne and State of Indiana, have invented a new and useful Compound and Composition of Matter to be used in treating and curing diphtheria, inflammatory diseases of the mouth and throat, scarlet fever, and diseases of a similar character, of which the following is a specification.

My said invention is a compound of matter consisting of the following-named ingredients, combined in the proportions here stated, viz: two drams and a half of bromide sodium, two drams and a half of sulpho-carbolate sodium, two drams of hydrate chloral, one ounce mixture (equal parts) whisky and water, ten drops of pure liquid carbolic acid, fifteen ounces sirup tolu, and three drams essence partridge-berry. These ingredients are prepared and combined in the following manner: Mix together, in the respective quantities stated, the bromide sodium, the sulpho-carbolate sodium, and the hydrate chloral, and place in a mortar and pulverize to a fine powder. Dissolve this powder in the ounce mixture of equal parts whisky and water. To this add the ten drops of carbolic acid and the fifteen ounces of sirup tolu and the three drams of essence of partridge-berry. These ingredients are then to be thoroughly mixed and mingled together by agitation, after which the compound is ready for use.

This compound is used by taking internally in doses as follows, to wit: For adults, one teaspoonful every hour in severe cases. For children, in like cases, a less quantity is required. The quantity to be taken, as well as the time of taking, is, of course, to be varied to suit the age of the patient and the form of the disease, as whether mild or malignant.

Diphtheria and many inflammatory diseases of the mouth and throat and scarlet fever are caused by minute germs of matter that are taken into the system through the air, which produce septic poisoning of the system. The use of the above composition, which is antiseptic, in the way and manner described, neutralizes this poison by its action on the blood, arrests putrefaction, and produces a cure.

I am not aware that the ingredients of my compound, in the proportions stated or in any other proportions, have ever been used together in the treatment of any disease or for any purpose whatever except by myself.

I am aware that the articles composing my mixture have been and are now used in the treatment of the class of diseases for which my compound is prescribed and used in their separate form; but I find that these ingredients, when combined in the proportions and in the manner described, have a different and much better effect on the diseases of diphtheria and analogous diseases than when used in any different combination or in their separate form.

What I claim as my invention, and desire to secure by Letters Patent, is—

The herein-described composition of matter, to wit: two and one-half drams of bromide sodium, two and one-half drams of sulpho-carbolate sodium, two drams of hydrate chloral, one ounce mixture (equal parts) whisky and water, ten drops pure liquid carbolic acid, fifteen ounces sirup tolu, and three drams essence partridge-berry, in the proportions substantially as stated.

GEORGE W. ROBBINS.

Witnesses:
 EVAN JONES,
 JOHN F. ROBBINS.